United States Patent [19]
Westhof et al.

[11] Patent Number: 5,501,819
[45] Date of Patent: Mar. 26, 1996

[54] CEMENTITIOUS COMPOSITION

[75] Inventors: Luc B. J. Westhof, Arendonk, Belgium; Ibrahim Turhan, Levitown; George G. Tessier, Holland, both of Pa.; Frans L. J. De Peuter, Mol, Belgium

[73] Assignee: ICI Americas Inc., Wilmington, Del.

[21] Appl. No.: 319,579

[22] Filed: Oct. 7, 1994

Related U.S. Application Data

[62] Division of Ser. No. 123,164, Sep. 20, 1993, Pat. No. 5,366,600, which is a division of Ser. No. 836,662, Feb. 14, 1992, abandoned.

[30] Foreign Application Priority Data

Feb. 12, 1991 [GB] United Kingdom ............... 9102891

[51] Int. Cl.$^6$ ................................................. H01B 1/02
[52] U.S. Cl. ................................. 252/503; 252/519
[58] Field of Search ........................ 106/644, 711, 106/783, 797; 252/500, 502, 503, 518, 519

[56] References Cited

U.S. PATENT DOCUMENTS

| | | | |
|---|---|---|---|
| 4,172,182 | 10/1979 | Stacy | 429/104 |
| 4,255,241 | 3/1981 | Kroom et al. | 204/196 |
| 4,395,159 | 7/1982 | Karuko et al. | 427/403 |
| 4,596,670 | 6/1986 | Liu | 252/511 |
| 4,725,491 | 2/1988 | Goldfein | 428/312.4 |
| 4,812,212 | 3/1989 | Diamond et al. | 204/196 |
| 5,055,166 | 10/1991 | Schutt | 204/196 |
| 5,183,694 | 2/1993 | Webb | 204/196 |

FOREIGN PATENT DOCUMENTS

| | | |
|---|---|---|
| 863146 | 3/1941 | France . |
| 1410163 | 10/1964 | France . |
| 1801561 | 8/1973 | Germany . |
| 2728555 | 6/1978 | Germany . |
| 1363429 | 8/1974 | United Kingdom . |

OTHER PUBLICATIONS

CA 103:75,440 (1985).
Clemena, Materials Performance, pp. 19–25 (Mar. 1988).
Chemical Abstracts, vol. 103, No. 10, Sep., 1985, No. 75440.

Primary Examiner—John Niebling
Assistant Examiner—Kishor Mayekar
Attorney, Agent, or Firm—Cushman Darby & Cushman

[57] ABSTRACT

A cementitious composition containing metal-coated fibres especially metal-coated carbon fibres in an amount of 0.1 up to 5% by weight relative to the weight of the cement component of the composition. The composition can be used as a conductive layer in a cathodically protected reinforced concrete.

6 Claims, No Drawings

CEMENTITIOUS COMPOSITION

This is a division of application Ser. No 08/123,164, filed Sep. 20, 1993, now U.S. Pat. No. 5,366,600, which is a division of Ser. No. 07/836,662, filed Feb. 14, 1992, now abandoned.

The present invention relates to cementitious compositions and in particular to such compositions which contain carbon fibre and which can be used in a cathodically protected, reinforced concrete structure.

Cementitious compositions are extensively used in many structures including bridges and high buildings and in structures of this type the cementitious composition may be reinforced by metal either as mesh or rod. The metal reinforcement is typically of steel. Many reinforced structures are exposed to weather and structures on or near the coast may be exposed to sea water or sea water spray. Furthermore, bridge structures may be subject to salt which is used in an attempt to keep road surfaces free from ice in winter months. The cementitious material is porous and water and/or salts can penetrate the concrete to the metal reinforcement which becomes corroded. The corrosion can result in deterioration of the reinforcement and in the bonding between the reinforcement and the surrounding concrete with the consequence that extensive restoration work may be required to prevent structure failure.

In an attempt to minimise such effects, it has been proposed that the reinforcement is protected by applying an electric current to the system with the reinforcement being the cathode. The anode in such a system may be a metal wire, or several metal wires, embedded in a conductive cementitious composition. The metal wires may be catalytic coated titanium or copper wires, especially copper wires coated with platinum or platinum-niobium. Conductivity of the cementitious composition is typically achieved by the inclusion in the cementitious composition of a quantity of carbon fibre which is sufficient to give the desired conductivity. Typically the quantity of the carbon fibre is in the range from 0.1 up to 5.0% by weight total cementitious composition. The use of a conductive cementitious composition of this type can give useful results but we have found that over a period of time the resistance of the composition increases and an increasingly greater applied voltage is required in order to maintain a given current flow. Indeed, we have found that, after a period of several months, it is even difficult to maintain any current flow.

Thus, according to the present invention there is provided a cementitious composition containing metal-coated fibres.

The cementitious composition may be any known cementitious composition and, in particular, is a composition which is suitable for use as an overlay for the primary anode in a cathodically protected reinforced concrete. The cementitious composition contains a hydraulic cement together with additives known for use in such compositions including, but not restricted to, fillers of various types, plasticisers, antifoaming agents and the like. However, it will be appreciated that the additives present in the cementitious composition should not be such as to have a deleterious effect on the electrical conductivity of the composition although the presence of additives which can supplement the conductivity of the composition is acceptable.

The metal-coated fibres may be derived from natural or synthetic polymers and include glass, polyethylene, polyester, nylon and especially carbon. A particularly preferred form of carbon fibre is graphite fibre. The fibres preferably have an average length of not more than about 25 mm, especially not more than 15 mm, and fibres of less than 10 mm in length have been used effectively. The coated fibres preferably have an average diameter of not more than 25 micrometers, especially not more than 15 micrometers and fibres having an average diameter of less than 10 micrometers have been found to give a useful effect. The metal coated onto the fibre is preferably a metal having good conductivity and furthermore the preferred metal for coating the fibre is an oxidation resistant metal. Metals having satisfactory conductivity and oxidation resistance include nickel, cobalt, silver, platinium and iridium and we have obtained useful results with nickel-coated carbon fibres. The metal coating need only be a thin coating which does not add substantially to the thickness of the coated fibre and preferably the metal coating has a thickness of not more than 20% of the thickness of the coated fibre. More especially the metal coating has a thickness of not more than one micrometre. The metal coating may be applied to the fibre using any suitable coating or deposition technique, for example electroplating. Metal-coated fibres such as carbon fibres are available commercially and any such material may be used in the cementitious composition of the present invention.

The metal-coated fibres are present in the cementitious composition in an amount sufficient to give a product having an increased conductivity. Preferably the cementitious composition contains at least 0.05% by weight, and especially at least 0.1% by weight of the metal-coated fibres. It is not necessary for the composition to contain more than 5% by weight of the metal-coated fibres and preferably the composition contains not more than 2% by weight of the metal-coated fibres.

The metal-coated fibres may be incorporated into the cementitious composition at any convenient stage of mixing. Thus, the fibres may be intimately mixed with any of the individual components of the composition or may be incorporated into the composition at the final stages of mixing.

The cementitious composition is based on a hydraulic cement by which is meant the class of structural materials which are applied in admixture with water and thereafter harden or set as a results of physical or chemical changes which consume the water present. A typical example of such material is Portland cement. Other hydraulic cements include:—

1. Rapidly hardening cements, as characterised by those with high alumina contents.

2. Low-heat cements as characterised by high percentages of dicalcium silicate and tetra-calcium alumino ferrite and low percentages of tricalcium silicate and tricalcium aluminate.

3. Sulphate resisting cements as characterised by unusually high percentages of tricalcium silicate and dicalcium silicate and unusually low percentages of tricalcium aluminate and tetracalcium alumino ferrite.

4. Portland blast-furnace cement as characterised by a mixture of Portland cement clinker and granulated slag.

5. Masonry cements as characterised by mixtures of Portland cement and one or more of the following: hydrated lime, granulated slag, pulverised limestone, colloidal clay, diatomaceous earth or other finely divided forms of silica, calcium stearate and paraffin.

6. Natural cements as characterised by material obtained from deposits in the Lehigh Vally, USA.

7. Lime cements as characterised by oxide of calcium in its pure or impure forms and whether containing or not some argillaceous materials.

8. Selenitic cement as characterised by the addition of 5–10% of plaster of Paris to lime.

9. Pozzolanic cement as characterised by the mixture of pozzolana, trass kieselguhr, pumice, tufa, santorin earth or granulated slag with lime mortar.

10. Calcium sulphate cements as characterised by those depending on the hydration of calcium sulphate and including plaster of Paris, Keene's cement and Parian cement.

The preferred hydraulic cement is Portland cement. White Portland cement, which is a cement of low iron and carbon content manufactured from specially selected ingredients, may also be used.

The cementitious composition typically contains at least one filler which is not a metal-coated fibre and, as examples of such fillers which may be employed, there may be mentioned, in particular, siliceous fillers such as sand and gravel having a low clay content, preferably washed and having a particle size in the range of between 0.076 mm and 4 cm. The cementitious composition is preferably a mortar and it is preferred that in such a composition the filler has a particle size of less than 2 mm.

The fillers used may be in their natural state or they may be artificially coloured, for example, by application of a dyestuff or pigment. Fragments of glass, which may be clear, translucent or opaque, colourless or coloured, are also suitable. Other fillers which may be used are materials which have a low density compared with the siliceous fillers mentioned previously herein for example, fragments of colourless or mass-pigmented plastic in the form of chips, turnings, tape or granules, conveniently the plastic waste resulting from the trimming of injection moulded articles or from other moulding processes. Suitable plastic materials include thermoplastic or thermosetting polymers and copolymers, for example, nylon polymers, polyvinyl chloride, vinyl chloride/vinyl acetate copolymers, urea/formaldehyde polymers, phenol/formaldehyde polymers, melamine/formaldehyde polymers, acetal polymers and copolymers, acrylic polymers and copolymers, acrylonitrile/butadiene/styrene terpolymers, cellulose acetate, cellulose acetate butyrate, polycarbonates, polyethylene terephthalates, polystyrenes, polyurethanes, polyethylenes and polypropylenes. Some plastic materials are conveniently mixed into the cementitious composition as an aqueous dispersion or emulsion.

Other fillers which may be used include foamed plastics such as polystyrene foam and polyurethane foam, and also sawdust, wood chips, pumice, vermicultite and fibrous materials of natural or synthetic origin, for example, glass fibre, cotton, wool, polyamide fibre, polyester fibre, and polyacrylonitrile fibre.

By the use of low density fillers the overall density of the products resulting from the compositions of the present invention may be greatly reduced if desired. Filler having a fine particle size, by which is meant in the range from 75 microns to 1 micron, may also be used, and as examples of such materials there may be mentioned power station fly ash, expanded clay, foamed slag, mica, chalk, talc, clays such as china clay, barytes, silica, and powdered slate, reduced to the required degree of subdivision where necessary by grinding, milling, micronising or other suitable means.

Other suitable fillers include aluminium silicate refractory aggregates made by high temperature calcination of a china clay specially selected for low alkali content, and obtainable commercially under the name "Molochire" (Registered Trade Mark); also crushed mineral aggregates manufactured from blue flints obtained from deposits in the Thames Valley and available commercially under the name "Flintag" (Registered Trade Mark) as well as multicoloured calcined flints.

In general the cementitious composition includes a siliceous filler, especially fine sand, to produce a mortar and may further include a plastic material such as an acrylic polymer. The siliceous filler is present in proportions known for such fillers in cementitious compositions, for example in an amount of up to several times by weight of the cement component, such as up to about five times and generally not more than three times. The plastic material, if present, is present in an amount which is typically from 2 up to 20% by weight relative to the weight of the cement component of the composition.

The cementitious composition of this invention may also comprise an effective amount of a plasticiser such as melamine/formaldehyde condensates or lignosulphonates. The proportion of the plasticiser preferably does not exceed 5% by weight of the cement component and is especially less than 1% by weight. If a plasticiser is present, it is preferably at least 0.1% by weight relative to the weight of the cement component.

Should the cementitious composition be such that it has a tendency to foam, then this tendency can be minimised by incorporating in the composition an effective amount of an antifoaming agent which may be a siloxane such as poly(siloxane), poly(alkylsiloxane) or poly(dialkylsiloxane).

The cementitious composition of the present invention can be used as a secondary anode in a cathodically protected reinforced concrete system in which the steel reinforcement is the cathode and a primary wire anode is embedded in the cementitious composition. The cementitious composition is preferably a mortar which can be sprayed to provide an overlay for the primary anode. The cementitious composition can be applied to give a horizontal, vertical or overhead substrate to overlay the primary anode. The cementitious composition can be used to provide an overlay of any desired thickness which will be dependent to some extent on the amount of wear and/or exposure to which the overlay is subjected. The overlay may be just sufficient to cover the primary anode or may be many times that thickness. Preferably the thickness of the overlay is at least 2 mm and particularly is at least 4 mm. In general there is no benefit if the thickness of the overlay exceeds 100 mm and preferably the thickness does not exceed 50 mm and especially does not exceed 20 mm.

The present invention is further illustrated by the following example which is not limiting.

EXAMPLES

A cementitious powder blend was prepared by dry blending. The blend had the following composition by weight:

| | |
|---|---|
| Portland cement | 60% |
| Polyethylene fibre | 0.1% |
| Plasticiser (melamine formaldehyde condensate) | 0.6% |
| Hydroxypropoxymethyl cellulose | 0.02% |
| Carbon fibre | 0.5% |
| Powdered defoamer (blend of hydrocarbons, fatty substances, non-ionic emulsifiers and silicone oil) | 0.2% |
| Graded silica sand (63–800 micrometres) | 38.58% |

The powder blend was mixed with an aqueous acrylic dispersion (available from Rohm and Haas as Primal MC76 - registered trade mark) having a solids content of 14% by weight, the proportions used being such that the acrylic polymer content was 4% of the weight of the cement component. The resulting mortar was coated as an overlay onto chloride contaminated steel reinforced concrete blocks containing, as a primary anode, a platinum-niobium copper wire having a diameter of 1.6 mm. The mortar as described was applied to give an overlay of 10 mm thickness. The ratio of the surface area of the primary anode to the secondary anode (carbon fibre) was 1:100.

Cathodic protection was applied to the system by means of a rectifier in a constant current mode. The system voltage required to maintain a constant current of 2.57 mA was noted at various times. The results are set out in the Table.

TABLE 1

| Time (months) | Volts | |
| --- | --- | --- |
| | Comp Ex A UC (a) | Ex 1 NC (b) |
| NIL | 1.20 | 0.97 |
| 1 | 1.60 | 1.14 |
| 2 | 11.6 | 1.24 |
| 3 | >20 | 1.49 |
| 4 | ND | 1.79 |
| 12 | ND | 2.13 |

Notes to Table 1
(a) UC is uncoated graphite fibre.
(b) NC is nickel-coated graphite fibre available as Cycom from American Cyanamid Company of Wayne, New Jersey, USA, having a fibre diameter of 8 micrometres, a nickel coating 0.5 micrometres thick and a nickel content of 504 of the total fibre weight.
ND indicates the voltage was not determined since the rectifier is limited to a maximum voltage of 20 volts. If the required system volts exceed this value due to increased resistivity, the applied current drops.

It will be observed that using the cementitious composition containing the uncoated fibre the applied voltage required to maintain the specified current became undesirably high within three months whereas using the cementitious compositions containing the nickel-coated fibre, the applied voltage required to maintain the specified current was still acceptably low after one year.

We claim:

1. A conductive cementitious composition containing a cement and nickel-coated carbon fibres in an amount sufficient to increase the conductivity of the composition.

2. A composition according to claim 1 wherein the fibre has an average length of not more than 25 mm.

3. A composition according to claim 1 wherein the fibre has a diameter of less than 10 micrometers.

4. A composition according to claim 3 wherein the thickness of the nickel coating is not more than 20% of the diameter of the coated fibre.

5. A composition according to claim 4 containing at least 0.05% by weight of the nickel-coated fibres.

6. A composition according to claim 5 wherein the cement is a hydraulic cement.

* * * * *